(12) United States Patent
Girardi et al.

(10) Patent No.: US 12,088,593 B2
(45) Date of Patent: *Sep. 10, 2024

(54) SYSTEM AND METHOD FOR TRUSTWORTHY INTERNET WHITELISTS

(71) Applicant: Sanctuary Networks LLC, Chantilly, VA (US)

(72) Inventors: Brian Girardi, Chantilly, VA (US); Philip Girardi, Ashburn, VA (US)

(73) Assignee: Sanctuary Networks LLC, Chantilly, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,663

(22) Filed: Jun. 1, 2023

(65) Prior Publication Data

US 2023/0319046 A1 Oct. 5, 2023

Related U.S. Application Data

(63) Continuation of application No. 16/960,567, filed as application No. PCT/US2019/013326 on Jan. 11, 2019, now Pat. No. 11,711,371.

(Continued)

(51) Int. Cl.
*H04L 9/40* (2022.01)
*G06F 7/08* (2006.01)
*H04W 12/60* (2021.01)

(52) U.S. Cl.
CPC .............. *H04L 63/101* (2013.01); *G06F 7/08* (2013.01); *H04L 63/1425* (2013.01)

(58) Field of Classification Search
CPC ... H04L 63/101; H04L 63/1425; H04L 63/20; H04L 63/1433; G06F 7/08; G06F 2221/2119

See application file for complete search history.

(56) References Cited

U.S. PATENT DOCUMENTS

| 10,628,228 B1* | 4/2020 | Theunissen ......... H04L 43/0876 |
| 2010/0235915 A1* | 9/2010 | Memon ................. H04L 63/145 709/224 |

(Continued)

OTHER PUBLICATIONS

You et al., "Authorization based on mobile whitelist in devices for device-to-device communications," 2018 International Conference on Information Networking (ICOIN) Year: 2018 | Conference Paper | Publisher: IEEE.*

(Continued)

*Primary Examiner* — Roderick Tolentino
(74) *Attorney, Agent, or Firm* — Kasha Law LLC; John R. Kasha; Kelly L. Kasha

(57) ABSTRACT

Information is received from a first networked device for a first user and from a second networked device for a second user. The first user and the second user are verified and registered. A first set of data for the first user and a second set of data for the second user that each specify one or more network parameters per network address that communicates with each user are received from a networked collector device. Addresses are selected from each of the first set and the second set where each of the one or more network parameters are above a first activity threshold level for that parameter. A first set and a second set of first level activity addresses are produced. A whitelist is generated for the first user from an intersection of the first set of first level activity addresses and the second set of first level activity addresses.

20 Claims, 14 Drawing Sheets

Related U.S. Application Data

(60) Provisional application No. 62/616,513, filed on Jan. 12, 2018, provisional application No. 62/788,155, filed on Jan. 4, 2019.

(56) References Cited

U.S. PATENT DOCUMENTS

| | | | | |
|---|---|---|---|---|
| 2013/0086237 | A1* | 4/2013 | Cutler | H04L 41/0893 709/223 |
| 2016/0094578 | A1* | 3/2016 | McQuillan | H04L 63/1466 726/23 |
| 2016/0294851 | A1* | 10/2016 | Langton | G06F 21/53 |
| 2017/0093918 | A1* | 3/2017 | Banerjee | H04L 41/0895 |
| 2017/0223046 | A1* | 8/2017 | Singh | H04L 63/1491 |
| 2017/0250989 | A1* | 8/2017 | Bhattacharya | G06F 21/62 |
| 2018/0077175 | A1* | 3/2018 | DiValentin | H04L 63/1425 |
| 2018/0357429 | A1* | 12/2018 | Barzik | H04L 63/0263 |

OTHER PUBLICATIONS

DeCato, Seth "Increasing the security on non-networked ground support equipment: Analyzing the implementation of whitelisting protection," 2016 IEEE AUTOTESTCON Year: 2016 | Conference Paper | Publisher: IEEE.*

* cited by examiner

SYSTEM AND METHOD FOR
TRUSTWORTHY INTERNET WHITELISTS

CROSS-REFERENCE TO RELATED APPLICATION

This application is a continuation of U.S. patent application Ser. No. 16/960,567, filed Jul. 8, 2020, which claims the benefit of U.S. Provisional Patent Application Ser. No. 62/616,513, filed Jan. 12, 2018, (hereinafter the "'513 application") and U.S. Provisional Patent Application Ser. No. 62/788,155, filed Jan. 4, 2019, (hereinafter the "'155 application") the contents of which are incorporated by reference herein in their entireties.

INTRODUCTION

The teachings herein relate to systems and methods for generating a network whitelist. More specifically, network transaction data from a first networked device of a first user and a second networked device of a second user is obtained by a collector device. A first set of first level "normal" activity addresses for the first networked device and a second set of first level "normal" activity addresses for the second networked device are selected from network traffic data. A whitelist for the first user of the first networked device is generated from the intersection of the first set and the second set.

The systems and methods disclosed herein are also performed in conjunction with a processor, controller, microcontroller, or computer system, such as the computer system of FIG. 1.

BACKGROUND

The Internet has become a critical part of society, and now just as important to protect as other critical infrastructure, like transportation, electricity, and water. The flexibility and openness that help propel the Internet has also created an environment for crime, fraud, and espionage to flourish and propagate at an unprecedented velocity in recent years. The Internet has reached a point where businesses cannot trust it, and our society is in a constant state of digital compromise, as the national news headlines highlight.

To compound this reality, the skills and manpower to secure anything connected to the Internet have become overpowered by global adversaries, explosive data and device growth, as well as Moore's Law of computing growth, with no end in sight. The human inability to keep up with this change has created a global imperative challenging how modern society operates securely on the Internet.

These dynamics highlight a fundamental flaw in how the world practices information security. Overwhelmingly, information security technology and services are attempting to identify, understand and prevent "the bad."

Network whitelists, notionally "the good," are considered to be one of the strongest and reliable network security methods to practice, foundations for when the Internet was invented, yet never been innovated upon in networking. A network whitelist includes trusted or good network addresses, for example. An ability to manage and apply whitelist information at scale has the potential to massively optimize multiple dimensions of network and security operations for enterprises, as well as providing options for future consumer protection on the Internet. There is accordingly a compelling need to provide transformational systems and methods to ensure that companies and individuals interact on a trustworthy, whitelisted, Internet at scale.

SUMMARY

A system, method, and computer program product are disclosed for generating a network whitelist. The system includes a first networked device, a second networked device, a networked collector device, and a computer system. The first networked device, the second networked device, the networked collector device, and the computer system are in communication with a network. The computer system provides a network service for the network.

The computer system receives identifying information from the first networked device for a first user and verifies and registers the first user as a user of the network service. The computer system receives identifying information from the second networked device for a second user and verifies and registers the second user as a user of the network service.

The networked collector device monitors the network transactions of the first networked device performed by the first user and second networked device performed by the second user. The computer system receives from the networked collector device for the first user a first set of data specifying one or more network parameters per network address that communicates with the first user of the first networked device. The computer system receives from the networked collector device for the second user a second set of data specifying one or more network parameters per network address that communicates with the second user of the second networked device.

The computer system selects addresses from each of the first set and the second set where each of the one or more network parameters are above a first activity threshold level for that parameter. A first set of first level activity addresses and a second set of first level activity addresses are produced. The computer system generates a whitelist for the first user from an intersection of the first set of first level activity addresses and the second set of first level activity addresses.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
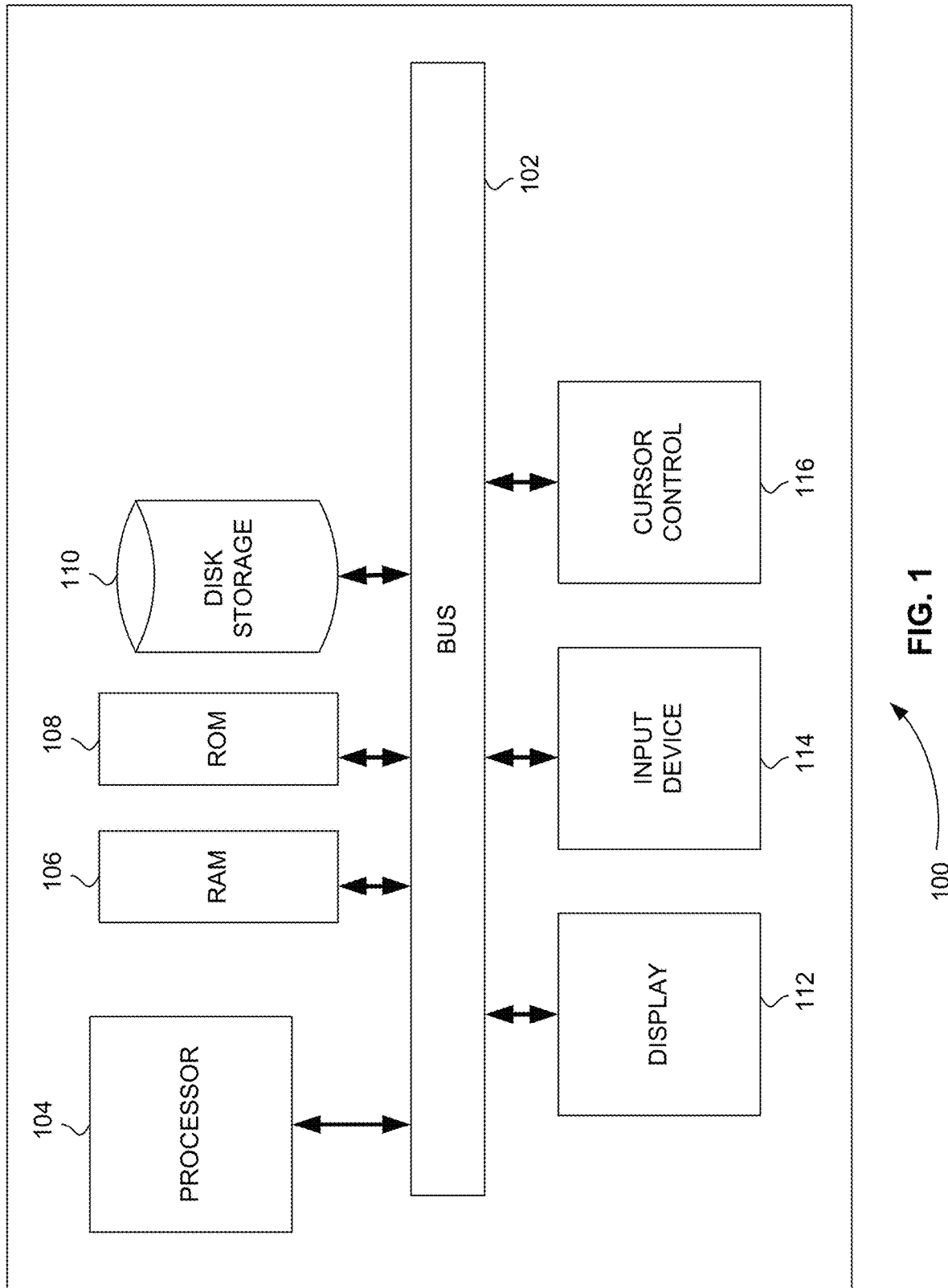
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software, but the present teachings may be implemented as a combination of hardware and software or in hardware alone. The present teachings may be implemented with both object-oriented and non-object-oriented programming systems.

Generating a Network Whitelist

To address the foregoing problems of digital compromise outpacing the networking industry's ability to provide stable security, various embodiments establish a network of legitimate and validated organizations that establish trust relationships to analyze, compare and intersect their normal network behavior. This results in a compounding whitelist of network entities that represent a more trustworthy neighborhood of Internet sources and destinations. In addition, the whitelist can be applied in real-time to an organizations network traffic to profile and report on impact, be operationally applied to networking devices to actively control network traffic, as well as represent baseline information to calculate risk and base quantifiable business decisions on.

Figure 2:
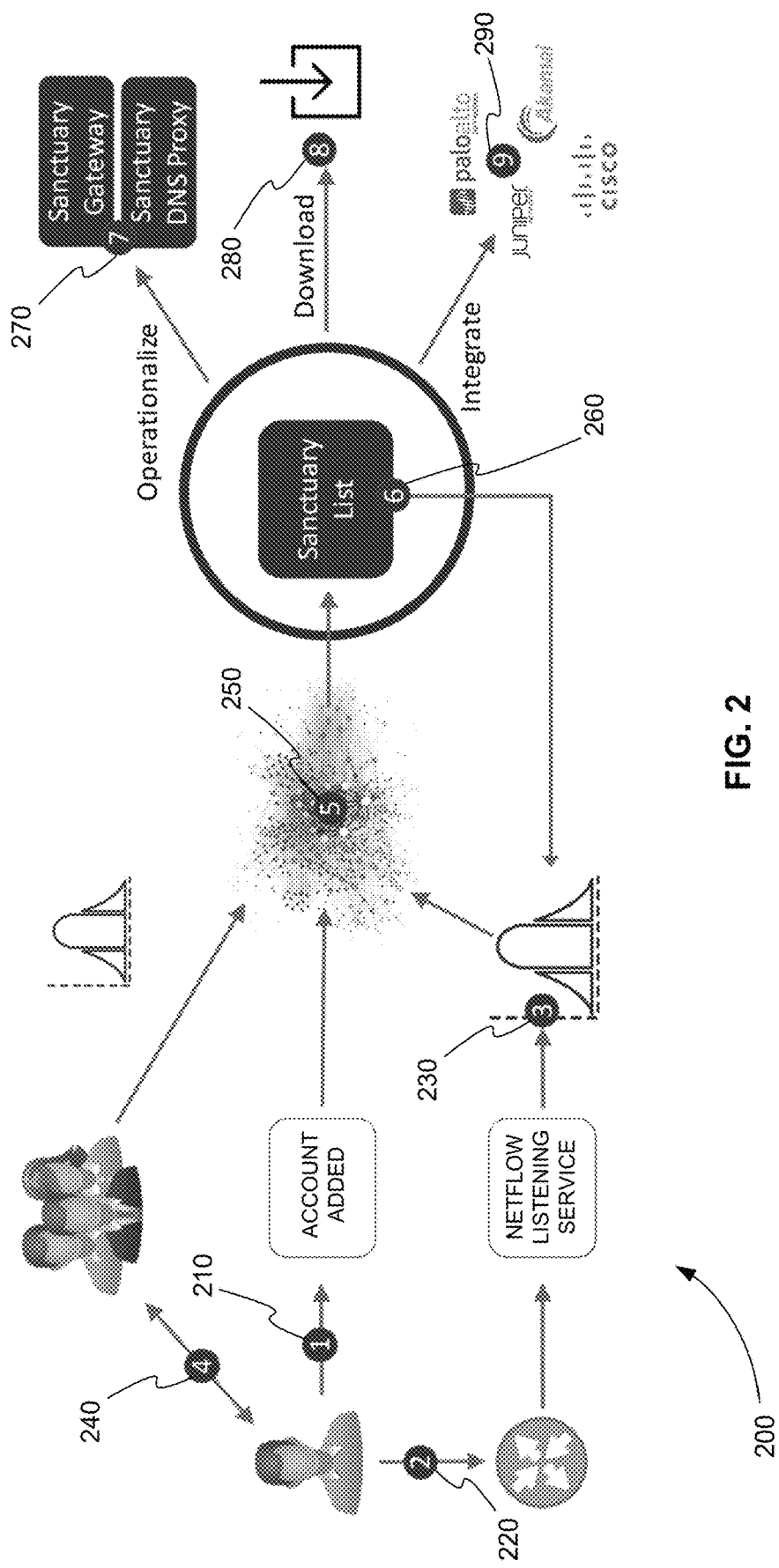
FIG. 2 is an exemplary diagram showing a method for generating a whitelist of network entities that represent a more trustworthy neighborhood of Internet sources and destinations, in accordance with various embodiments.

FIG. 2 is an exemplary diagram 200 showing a method for generating a whitelist of network entities that represent a more trustworthy neighborhood of Internet sources and destinations, in accordance with various embodiments.

In various embodiments, a tenant or user registers (step 210) to establish dedicated, securely provisioned data collection and analysis services. During registration, the tenant provides uniquely identifying information about its organization, including but not limited to name, address, location, type of business, Dun and Bradstreet (DUN), etc. Upon tenant verification, proof-of-authenticity, the tenant is provided configuration information to configure network data sources into the system services. Below the terms "user" and "tenant" are used interchangeably. These terms can refer to a single user or two or more users of an organization, such as a company or enterprise.

Then, in step 220, network transaction records from a plurality of network data sources of one tenant are securely transmitted to a collector. Securely stored transaction records, for example, can include, but are not limited to, network traffic statistics summarizing protocol, Internet protocol (IP) address, Port communicant frequency, and communication volume (byte count, packet count, session count), as would be defined in v5+ of the published Netflow standard.

In step 230, per tenant (conveying a multi-tenant architecture), network entities, such as IP address, IP port, or MAC address as well as network communicants, are baselined to profile activity over a configurable set time frame (e.g., 30-days). Baseline analysis can include statistical and machine learning techniques to define normal.

In various embodiments, a list of normal IP addresses (IPv4) is created, but could be expanded to any type of network entity (such as IPv4, IPv6, MAC Address, IP port, hostname, etc.).

Figure 3:
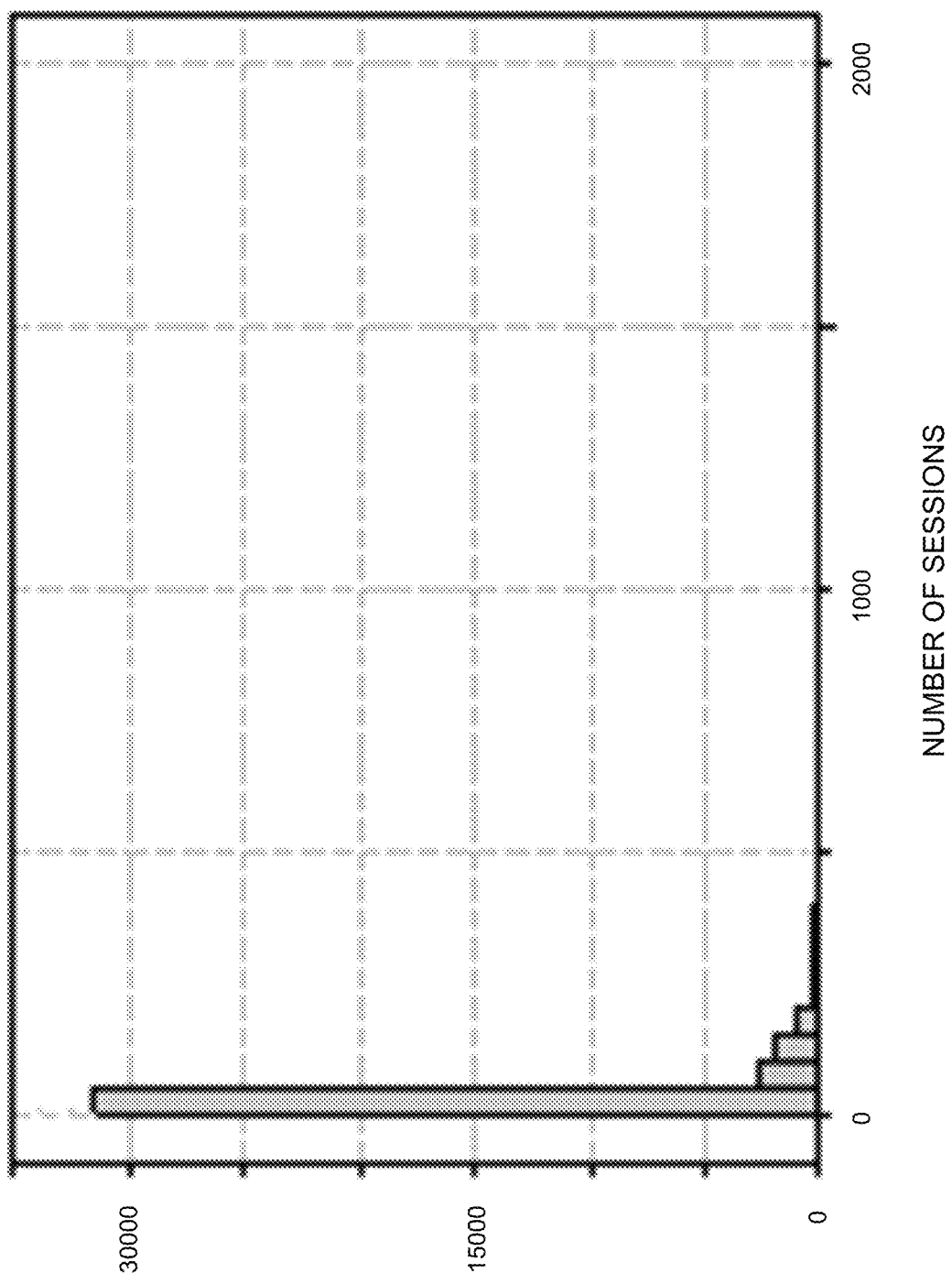
FIG. 3 is an exemplary plot of sampled IP data from a home network that shows a histogram of the sessions for 40,000 IP addresses collected over a 30-day period plotted, in accordance with various embodiments.

FIG. 3 is an exemplary plot 300 of sampled IP data from a home network that shows a histogram of the sessions for 40,000 IP addresses collected over a 30-day period plotted, in accordance with various embodiments.

Figure 4:
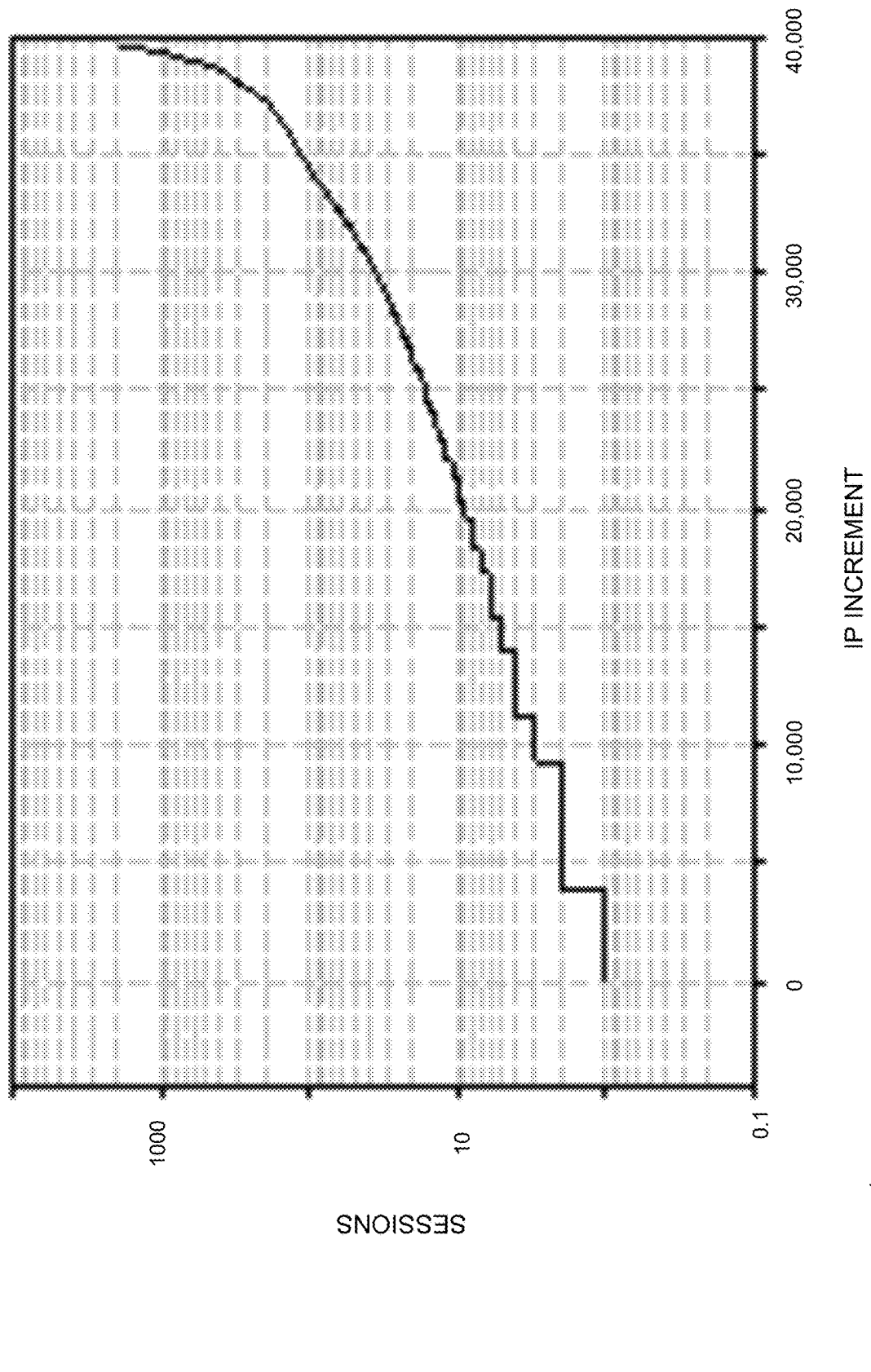
FIG. 4 is an exemplary plot of the same sessions data shown in FIG. 3 plotted so that the 40,000 IP addresses over the 30-day period are sorted from addresses with the minimum number of sessions to addresses with the maximum number of sessions, in accordance with various embodiments.

FIG. 4 is an exemplary plot 400 of the same sessions data shown in FIG. 3 plotted so that the 40,000 IP addresses over the 30-day period are sorted from addresses with the minimum number of sessions to addresses with the maximum number of sessions, in accordance with various embodiments.

Figure 5:
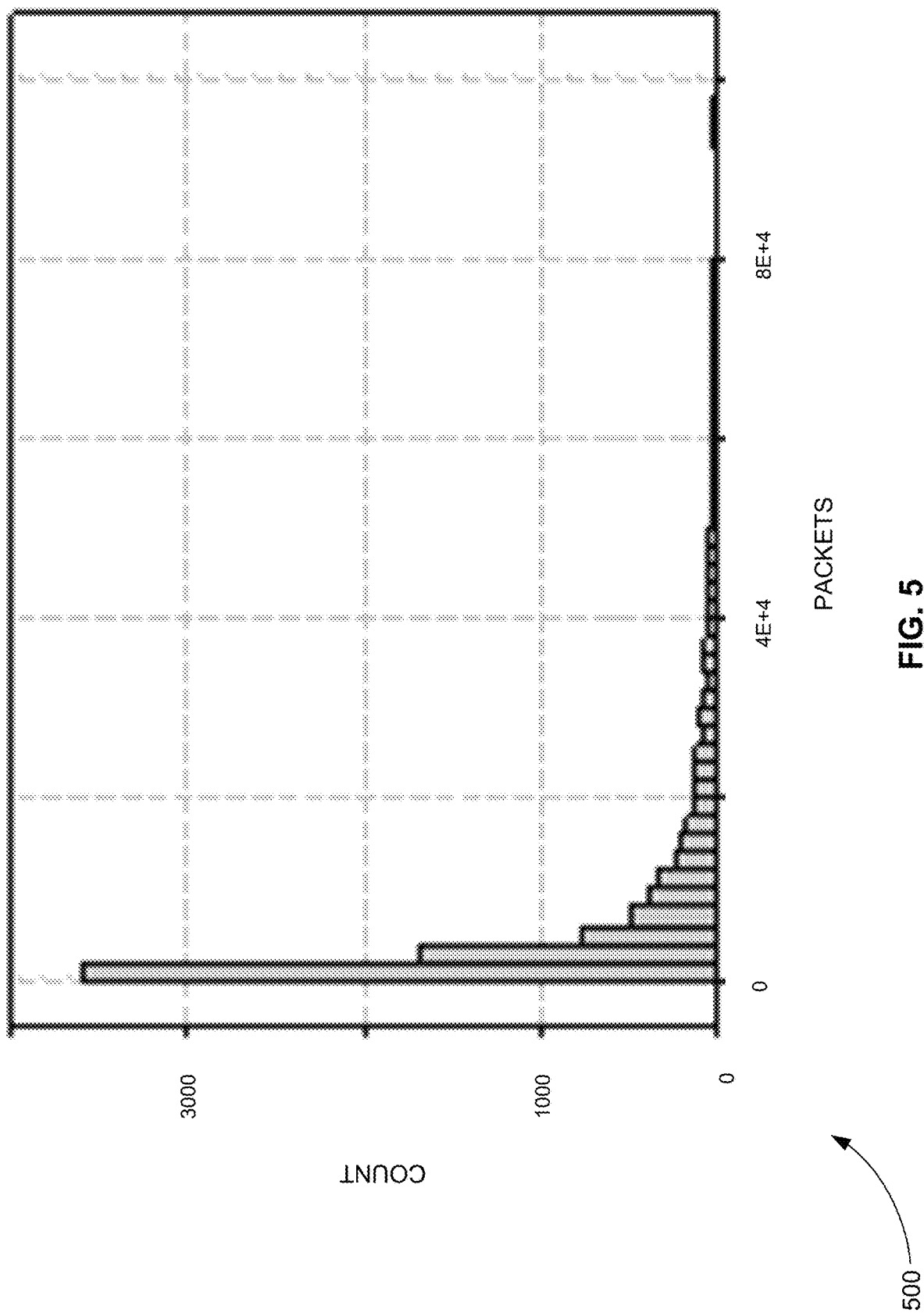
FIG. 5 is an exemplary plot of sampled IP data from a home network that shows a histogram of the packets for 40,000 IP addresses collected over a 30-day period plotted, in accordance with various embodiments.

FIG. 5 is an exemplary plot 500 of sampled IP data from a home network that shows a histogram of the packets for 40,000 IP addresses collected over a 30-day period plotted, in accordance with various embodiments.

Figure 6:
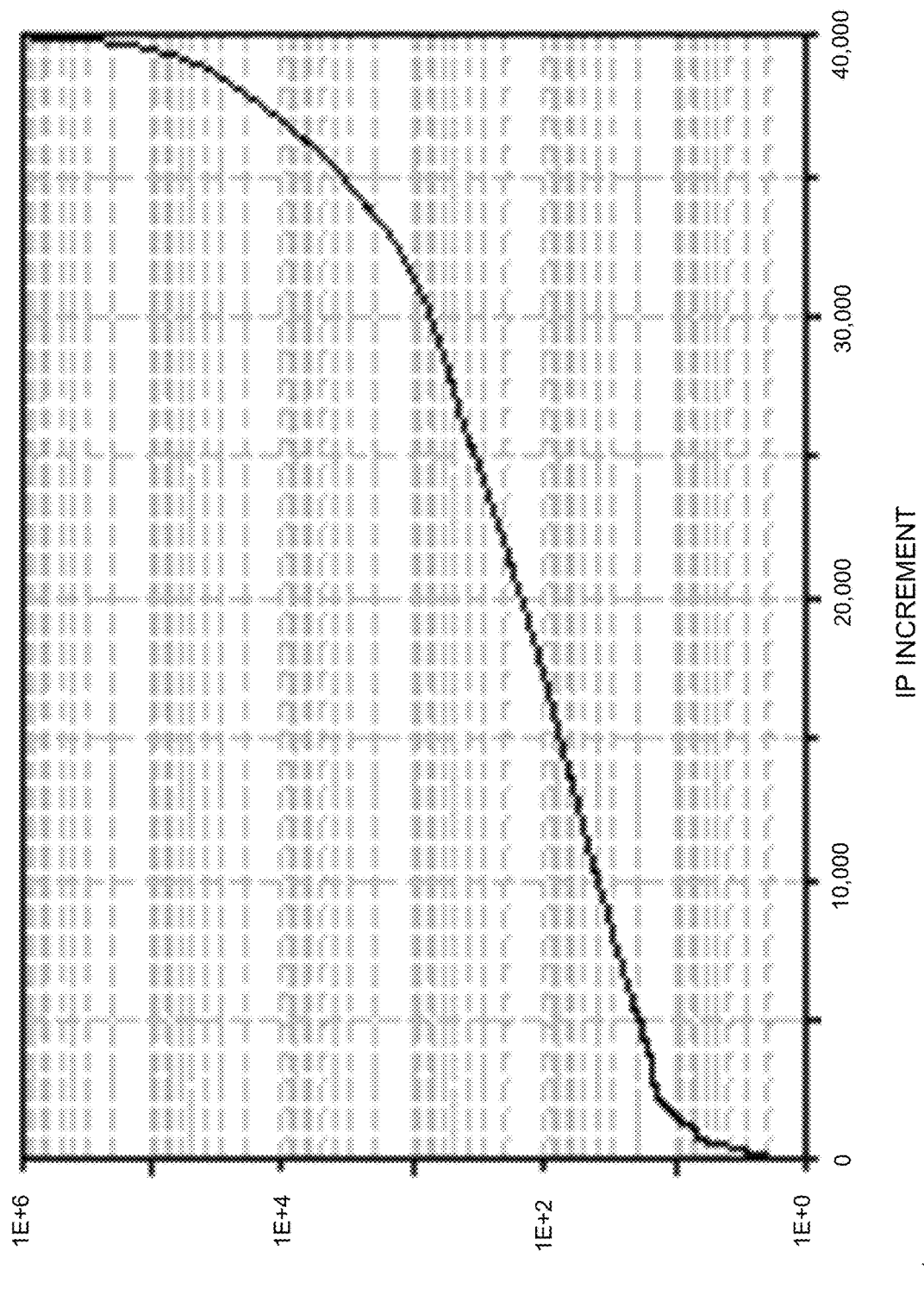
FIG. 6 is an exemplary plot of the same packets data shown in FIG. 5 plotted so that the 40,000 IP addresses over the 30-day period are sorted from addresses with the minimum number of packets to addresses with the maximum number of packets in increasing order, in accordance with various embodiments.

FIG. 6 is an exemplary plot 600 of the same packets data shown in FIG. 5 plotted so that the 40,000 IP addresses over the 30-day period are sorted from addresses with the minimum number of packets to addresses with the maximum number of packets in increasing order, in accordance with various embodiments.

Figure 7:
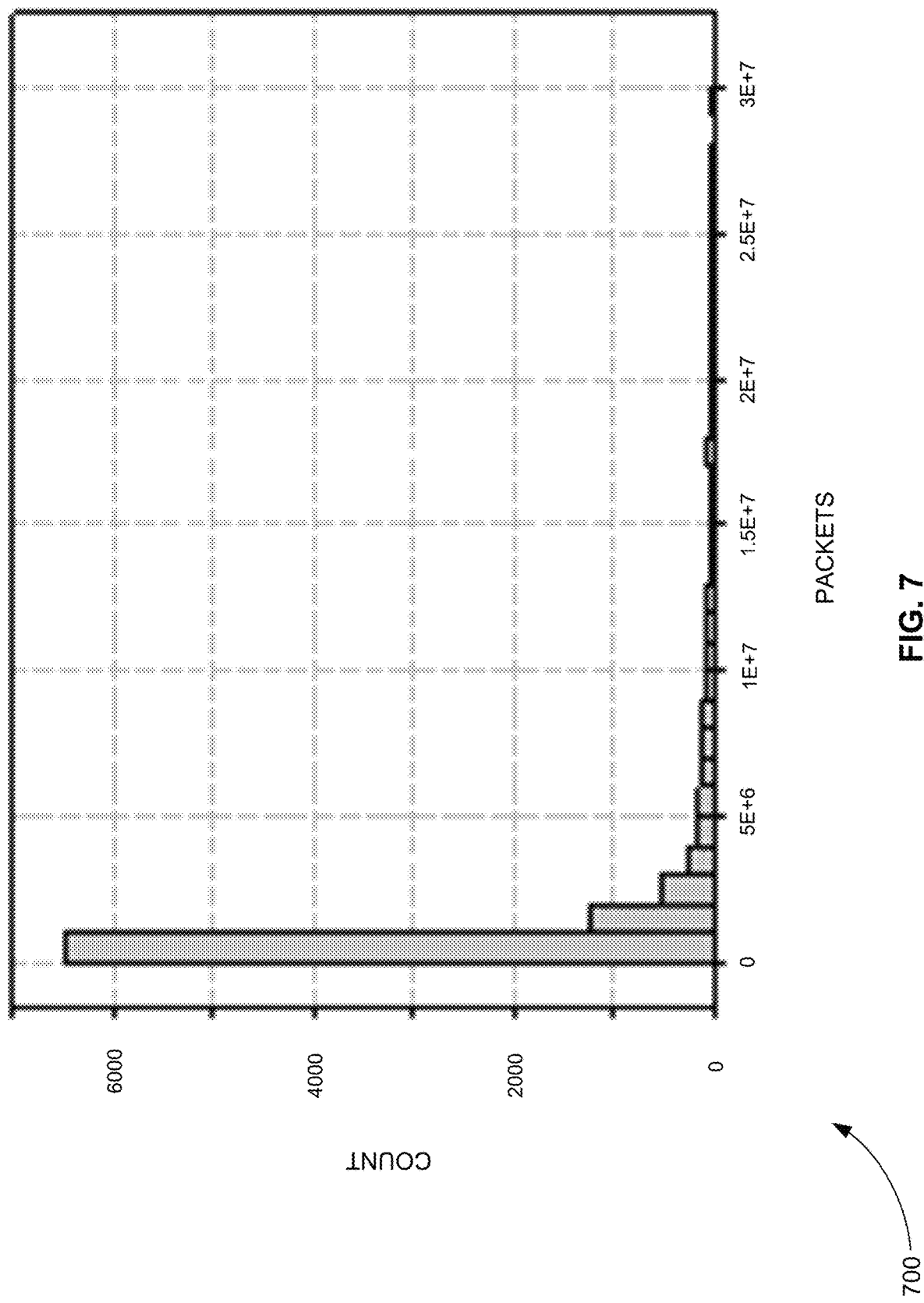
FIG. 7 is an exemplary plot of sampled IP data from a home network that shows a histogram of the bytes for 40,000 IP addresses collected over a 30-day period plotted, in accordance with various embodiments.

FIG. 7 is an exemplary plot 700 of sampled IP data from a home network that shows a histogram of the bytes for 40,000 IP addresses collected over a 30-day period plotted, in accordance with various embodiments.

Figure 8:
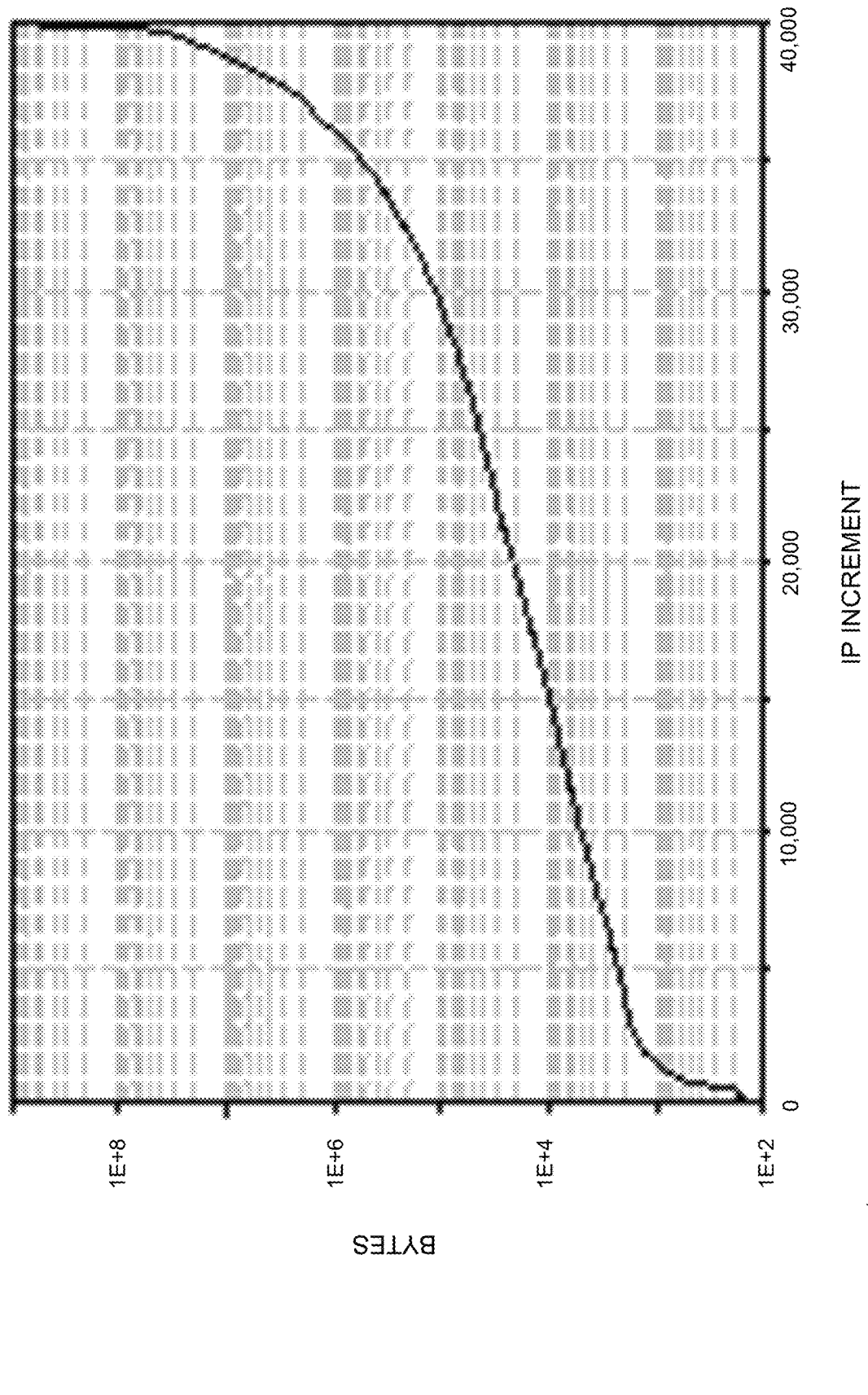
FIG. 8 is an exemplary plot of the same bytes data shown in FIG. 7 plotted so that the 40,000 IP addresses over the 30-day period are sorted from addresses with the minimum number of bytes to addresses with the maximum number of bytes, in accordance with various embodiments.

FIG. 8 is an exemplary plot 800 of the same bytes data shown in FIG. 7 plotted so that the 40,000 IP addresses over the 30-day period are sorted from addresses with the minimum number of bytes to addresses with the maximum number of bytes, in accordance with various embodiments.

Note that in FIGS. 4, 6, and 8 the IP activity irrespective of the IP parameter has the same general characteristic shape when placed in increasing or decreasing order. Also note that most of the IPs have very little parameter activity, very few IPs have extremely high parameter activity and there is a transition region between the two. Also notice that since the IPs are received randomly, they can be viewed statistically with histograms. The probability distributions of the IP parameters have the same functional shape, but with different means and standard deviations. These characteristics are similar for the several tenants sampled.

Combining these observations one can quantify the activity and normalize it between tenants, selecting the most frequently and commonly used IP addresses that are assumed to be the most likely to be normal and "safer." This is fundamental for whitelist generation.

Figure 9:
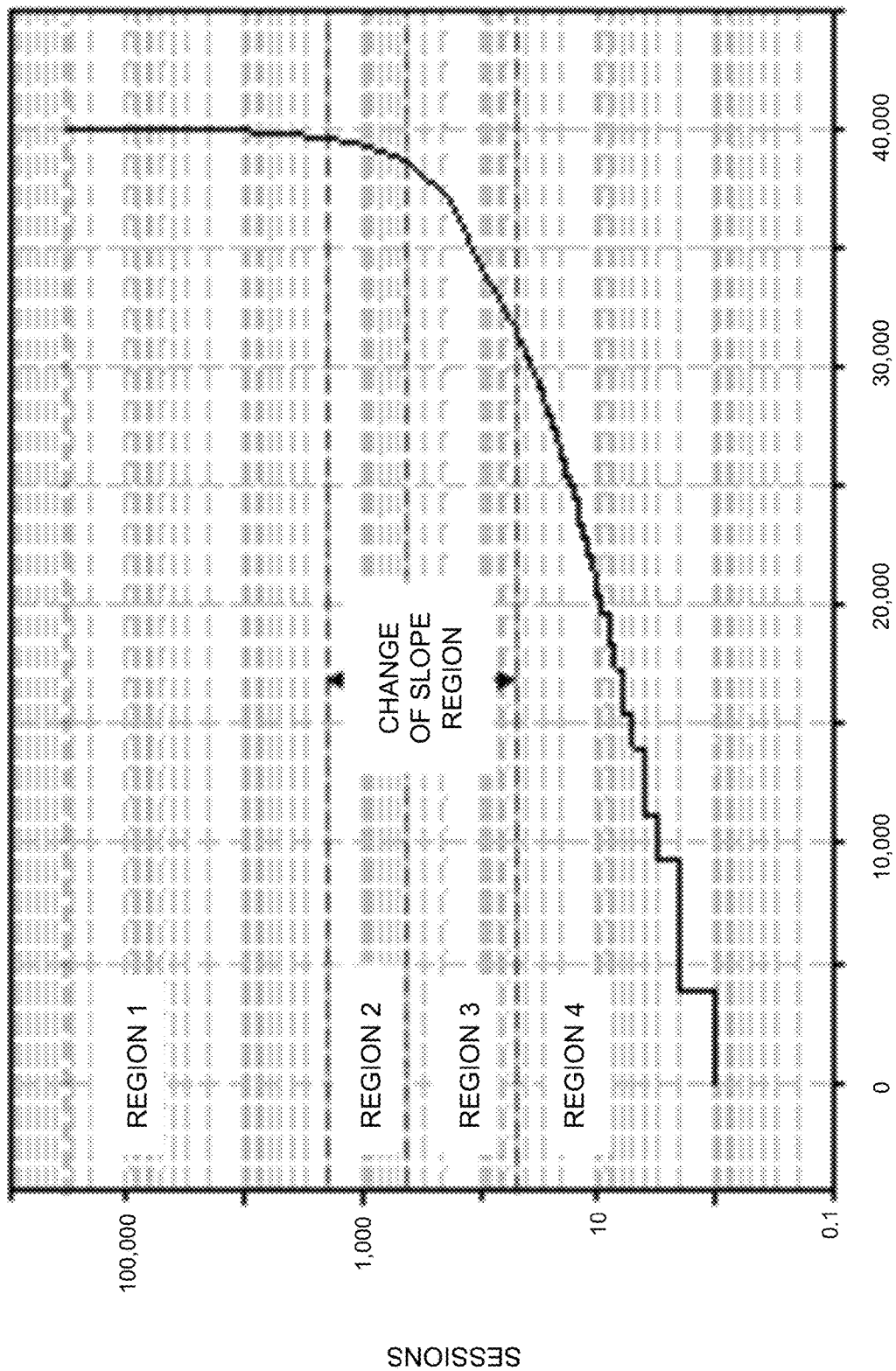
FIG. 9 is an exemplary plot of the same sessions data shown in FIG. 4 with four regions delimited, in accordance with various embodiments.

FIG. 9 is an exemplary plot 900 of the same sessions data shown in FIG. 4 with four regions delimited, in accordance with various embodiments. Again, FIG. 9 shows IP activity for the maximum number of sessions for 40,000 IPs over a one-month sampling period sorted from minimum to maximum and the region definition over the range of the data. Similar plots could be made for packets and bytes.

Note that Region 1 defines the "high talkers," where the slope of the curve is the steepest. Region 4 defines the area of low activity, where the slope of the curve is the least steep. The "change of slope region" defines those IPs that bridge the gap between the "high talkers" and the IPs of low activity. Region 2 is the top 10% of the change of slope region, but could be variably defined at any reasonable percentage. Region 3 is the lower 90% of the change of slope region, but could also be variably defined at any reasonable percentage.

The region definitions are automated by applying support vector machine techniques along with the derivative of the data that will identify inflection regions in the data that define the boundaries for the data activity regions.

A figure of merit (FoM) for each IP is computed for each tenant to score the relative activity observed in the collected data. This is used to grade the strength of the IPs when IPs are compared between tenants and threshold IPs when IPs are upgraded by IP class. The FoM can be calculated according to the following equation, for example.

$$\text{FoM for each } IP = \frac{\text{Number of Sessions}}{\text{Total Sessions}} + \frac{\text{Number of Packets}}{\text{Total Packets}} + \frac{\text{Number of Bytes}}{\text{Total Bytes}} \quad (1)$$

Returning to FIG. 2, Regions 1, 2, 3, and 4 define the data that is used to create white, gray, and blacklists per tenant in step 250. For example, a Tenant Sanctuary List (TSL) whitelist shown in step 260 is generated in step 250 using methods that include, but are not limited to, set theory, graph theory, or statistics.

Figure 10:
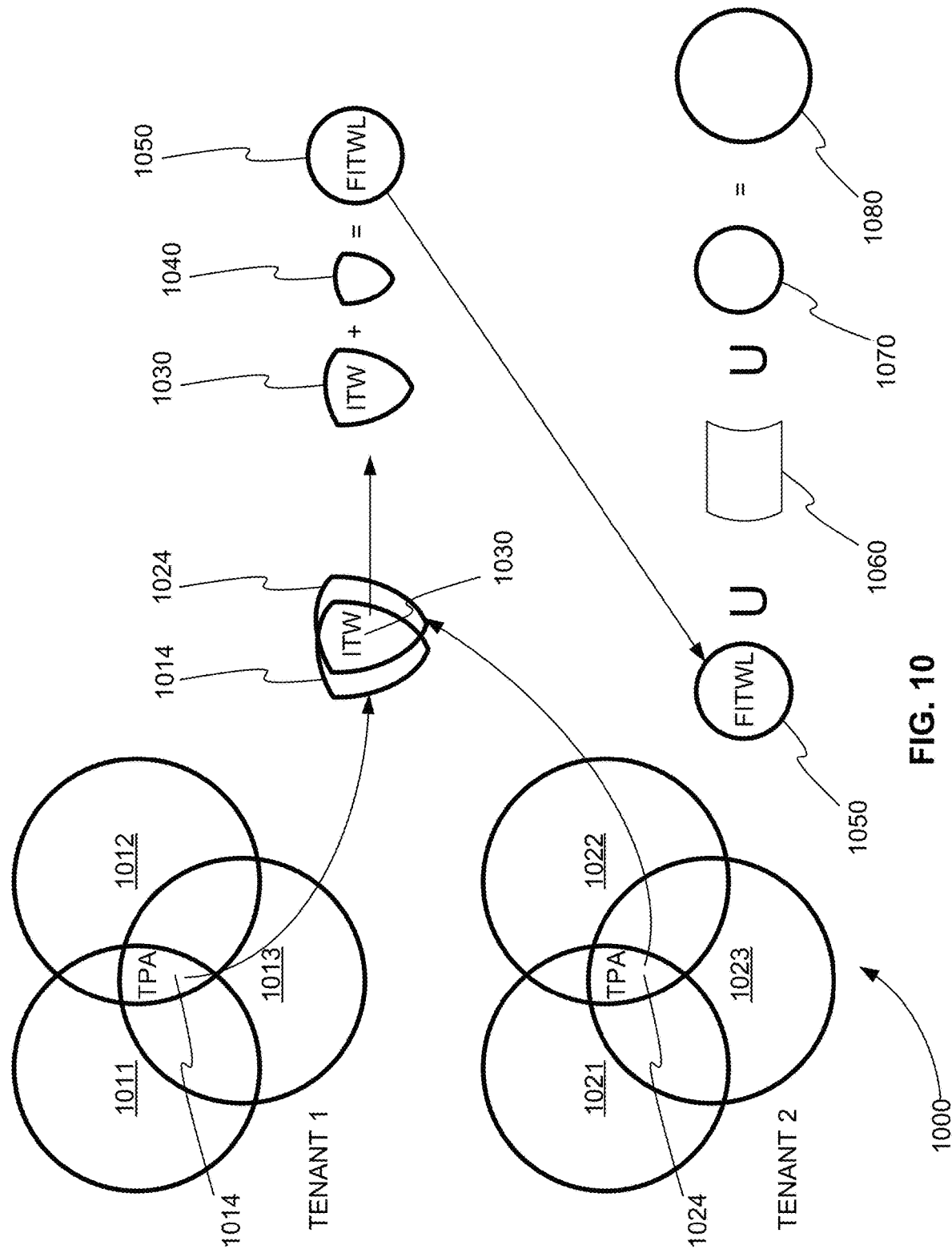
FIG. 10 is an exemplary diagram showing how a whitelist in generated using set theory, in accordance with various embodiments.

FIG. 10 is an exemplary diagram 1000 showing how a whitelist is generated using set theory, in accordance with various embodiments. In FIG. 10 data is "intersected," evaluated, and "unioned." The first step in generating a TSL whitelist is to use set theory to intersect IP Regions 1 and 2 across sessions, packets, and bytes for each tenant, to find the most active IP addresses for a single tenant. It is assumed that the most active IPs (tenant IP parameters (TPAs)) establish a solid foundation for a whitelist to compare across tenants.

For example, for Tenant 1 in FIG. 10, set 1011 represents the IP addresses with sessions in Regions 1 and 2, set 1012 represents the IP addresses with packets in Regions 1 and 2, and set 1013 represents the IP addresses with bytes in Regions 1 and 2. The intersection of sets 1011, 1012, and 1013 is TPA 1014. Similarly, for Tenant 2, set 2101 represents the IP addresses with sessions in Regions 1 and 2, set 1022 represents the IP addresses with packets in Regions 1 and 2, and set 1023 represents the IP addresses with bytes in Regions 1 and 2. The intersection of sets 2101, 1022, and 1023 is TPA 1024.

In step 240, set theory is applied again to the TPA results. The TPA results are intersected across "friended" tenants, resulting in an intersected tenant whitelist (ITW). This ITW includes the most active IPs that are shared across all "Mended" tenants.

Tenants are provided a user experience to allow them to establish mutual trust relationships between two or more other system tenants "friending." Relationships may be established by personal/business connections, vertical, geographic, LinkedIn, or effective recommendations made by the system itself. Relationship levels are established to define the degree of trust between the tenants. The established trust relationship authorizes the intersection of their respective network baselines as described above in the TSL process, that results in a mutual whitelist. When compounded across many trust relationships the trustworthiness of the resulting whitelist is strengthened. In addition, when 10 or more intersections exist, those entities can be escalated to a global list that represents the most "trustworthy" internet entities.

For example, in FIG. 10, TPA 1014 for Tenant 1 and TPA 1024 for Tenant 2 are compared. The intersection of TPA 1014 and TPA 1024 is ITW 1030.

In various embodiments, the ITW results are evaluated in a "class upgrade" process to identify IPs within the tenant that have heightened significance as a result of the "Mended" intersection, but didn't fall into Regions 1 and 2. Region 3 and 4 IPs are identified that share IP Class (B or C) with ITW IP's and have a FoM threshold that is statistically significant. This class grouping Region 3 and 4 IPs adds IP addresses with lesser activity in Regions 3 and 4 to the ITW list of first level activity IPs. As an added precaution, FoM is also applied to limit potential pollution of this process that may occur by assuming class commonality without an activity volume influence. The result of adding some Region 3 and 4 IPs to the ITW is a final intersected tenant whitelist (FITWL).

For example, in FIG. 10, for Tenant 1 Region 3 and 4 IPs 1040 are identified that share IP Class (B or C) with ITW 1030 and have a FoM threshold that is statistically significant. These Region 3 and 4 IPs 1040 are added to ITW 1030 to produce FTIWL 1050.

Class grouping is described as follows. For each IP address there are four parts aaa.bbb.ccc.ddd. These are known as classes. Class A network 'aaa' which contains class B 'bbb' which in turn contains class C 'ccc' and so on. Grouping by class C combines all IP addresses with the same aaa.bbb.ccc component and reduces meaningless feature diversity (e.g., contacting one of Google's severable IP addresses) without losing significant organizational discrimination) (e.g., using YAHOO instead of GOOGLE as a search engine). Grouping by class B or C is appropriate.

A TSL whitelist is then built. A TSL for a tenant can be built from the FITWL or the ITW. A TSL can be built every day for every tenant for a monthly moving window, ultimately producing a daily whitelist per tenant.

In various embodiments, a TSL for a tenant can include additional addresses. For example, a TSL can be a union of the FITWL (results from "class upgrade"), a managed tenant whitelist (a list that a tenant can manually maintain), and class grouped residual IPs from a TPA intersection (ResPar). ResPar is the union of the IP Regions 1 and 2 for sessions, packets, and bytes minus the TPA region. The class grouped ResPar is all IP addresses of ResPar that share IP Class (B or C) with ITW IP's and have a FoM threshold that is statistically significant. For example, in FIG. 10, TSL 1080 for Tenant 1 is the union of FTIWL 1050, managed tenant whitelist 1060, and class grouped ResPar 1070.

In various embodiments, a TSL whitelist can further include class grouped residual TPA IP Addresses. For example, the IP addresses of TPA 1014 that are not included in ITW 1030 can be class grouped and added to TSL 1080 of Tenant 1. The class grouped IP addresses of TPA 1014 that are not included in ITW 1030 are all IP addresses of TPA 1014 not included in ITW 1030 that share IP Class (B or C).

Returning to FIG. 2, the resulting whitelist for each tenant represents a strong, and highly trustworthy set of Internet entities that can be leveraged for network and security analytics, used to measure tenant risk and liability, as well as operationalized through network gateways or DNS servers (step 270), or other networking technology (step 290) to actively control tenant traffic across any infrastructure platform. In various embodiments, the resulting whitelist can be downloaded and used by any networking system (step 280).

In various embodiments, the intersection of IP Regions 3 and 4 across sessions, packets, and bytes are used to create a graylist and blacklist respectively. Gray list generation is provided to help classify IP addresses in Region 3 of FIG. 9, for example. This process is similar to the method for creating the TSL whitelist shown in FIG. 10. However, in this case, the inputs are Region 3 data for the sessions, packets, and bytes, and tenant IP intersections. Region 4 data is further evaluated in the "class upgrade" stage.

Black list generation is provided to help classify IP addresses in Region 4 of FIG. 9, for example. This process is similar to the method for creating the TSL whitelist shown in FIG. 10. However, in this case, the inputs are Region 4 data for the sessions, packets, and bytes, and tenant IP intersections. All previously unclassified IPs are evaluated in the "class upgrade" stage.

Graylist and blacklist generation are described in the '513 application and the '155 Application. As described above, the '513 Application and the '155 application are incorporated herein in their entireties.

In practice, tenant observed IP connections are dynamic and constantly changing. New and never before seen IPs appear, and existing IPs cease activity minute by minute. Hence, between the daily creation of the white, gray, and blacklists, decisions need to be intelligently made to classify the new IPs seen in the tenant.

Figure 11:
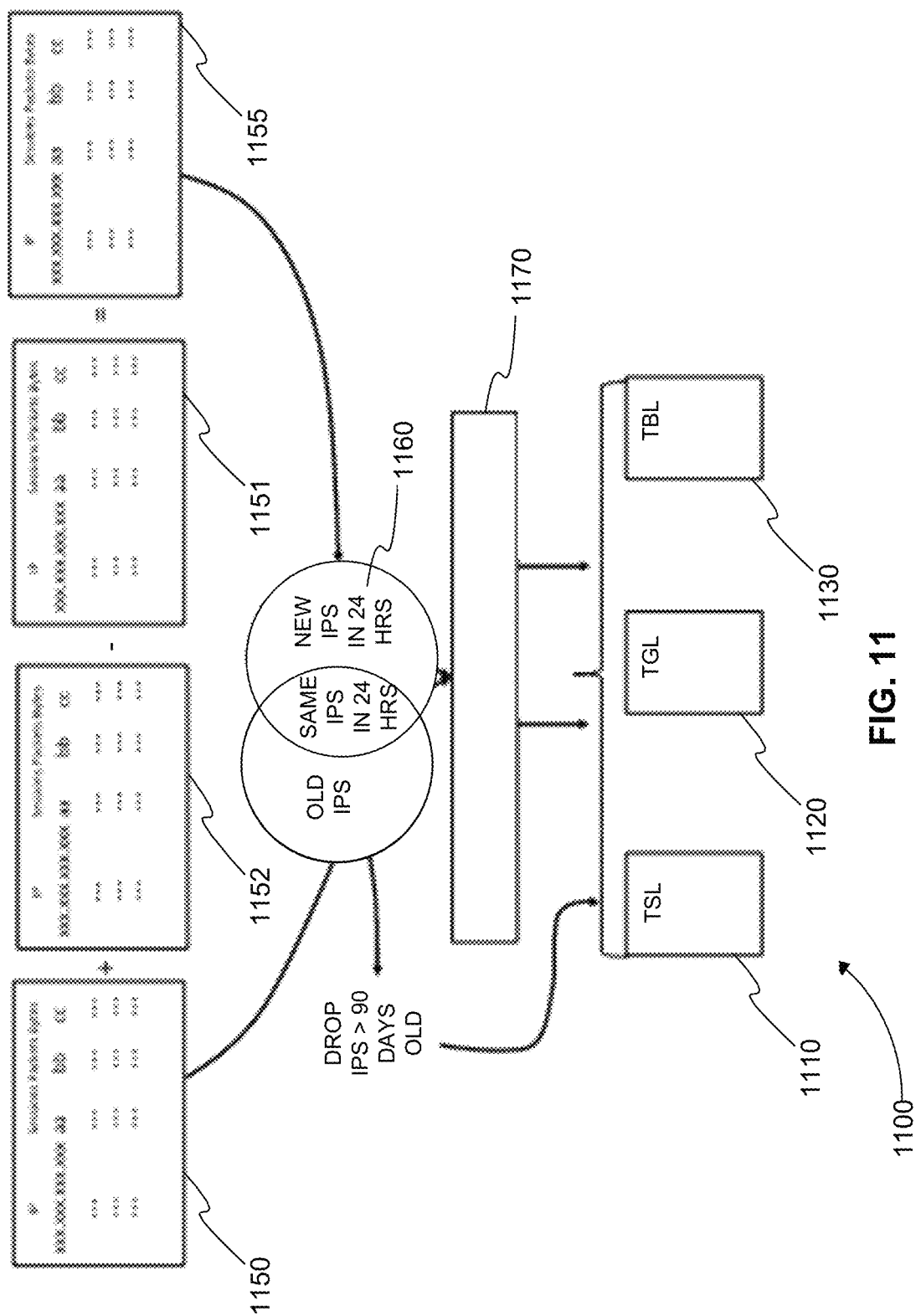
FIG. 11 is an exemplary diagram showing how white, gray, and blacklists are updated with new address information, in accordance with various embodiments.

FIG. 11 is an exemplary diagram 1100 showing how white, gray, and blacklists are updated with new address information, in accordance with various embodiments. Whitelist or TSL 1110, tenant graylist (TGL) 1120, and tenant blacklist (TBL) 1130 are periodically updated for each tenant based on the tenant's continual IP traffic and the reception of new IPs and the associated parameter data. The original tenant lists described above, which are based on a 30-day collection of data, are updated daily with new tenant data collected. Each day, one day of new data set is added to the old data set of each tenant while the first day of the original data set is dropped off still resulting in 30 days of data for each tenant.

This data set is intersected with the old, identifying all IPs that remain. If the IP parameters have changed in the intersected lists, a Bayesian Inference process, or other statistical and machine learning techniques, is applied to the existing lists to determine which list the IP should be assigned to. The IP parameters are then updated. If the IP parameters have not changed, the IP remains on the list it was originally applied to.

For example, for each tenant each day, the last 24 hours of new network data 1152 is added to the 30 days of original network data 1150 and the first day of original network data 1151 is subtracted from the 30 days of original network data 1150. The result is daily updated network data 1155.

New addresses 1160 are derived from the original data 1150 and the new data 1155 by identifying all the new IPs that have been received by the tenant in the past day. The same Bayesian Inference 1170 process is then applied to determine which list the new IP can be added to. The next time that IP is received it is placed on a list and processed accordingly. Any old IP address that is not seen again for 90 days, or variable timeframe, is dropped from the list that it was on. This is continued on a daily basis for each tenant.

After a specified time, likely 24 hours, new tenants may be added to the overall mix where 30 days of the new tenant data is used. Each tenant list is re-generated with the current tenant data and in the same manner as was done originally.

System for Whitelist Generation

Figure 12:
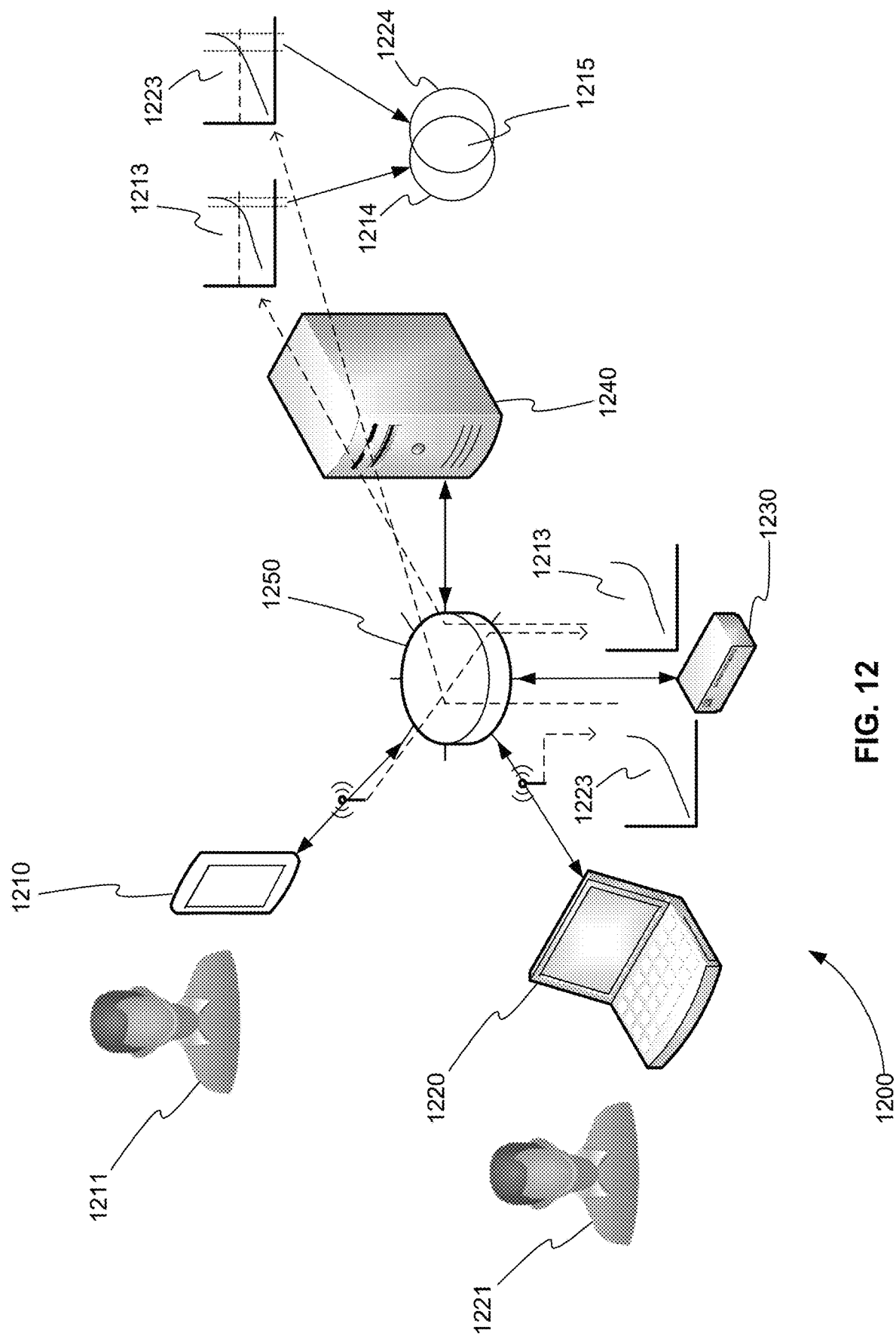
FIG. 12 is a schematic diagram of a system for generating a network whitelist, in accordance with various embodiments.

FIG. 12 is a schematic diagram 1200 of a system for generating a network whitelist, in accordance with various embodiments. The system of FIG. 12 includes first networked device 1210, second networked device 1220, networked collector device 1230, and computer system 1240. First networked device 1210, second networked device 1220, networked collector device 1230, and computer system 1240 are in communication with network 1250.

First networked device 1210 and second networked device 1220 can be any type of electronic device capable of sending and receiving information across an electronic network. For example, networked device 1210 and second networked device 1220 can be any type of networked or network device including, but not limited to, a smartphone, a car, a tablet, a gaming device, a computer, a streaming device, or an Internet of things (IoT) device.

Computer system 1240 can be any type of computing device including, but not limited to, a computer server or a system such as the system of FIG. 1. Computer system 1240 provides a network service for network 1250. The network service can be any type of network service. Network 1250 can be any type of network including, but not limited to, the Internet, an intranet, or a phone network.

Networked collector device 1230 can be any type of networked device that can monitor, store, and transmit network transactions performed across a network. Networked collector device 1230 can be a general computer system, a general networking device, or a dedicated device designed specifically to monitor, store, and transmit network transactions.

In FIG. 12, networked collector device 1230 is shown as one device. In various embodiments, more than one networked collector device can be used. For example, there can be one networked collector device per user. Also, for example, a company can collect data on many users. Then a second company can collect data on many users. In this scenario, each company has a "collection device" or networked collector device.

Computer system 1240 receives identifying information from first networked device 1210 for a first user 1211 and verifies and registers first user 1211 as a user of the network service. Computer system 1240 receives identifying information from second networked device 1220 for a second user 1221 and verifies and registers second user 1221 as a user of the network service.

Note that first user 1211 and second user 1221 are each shown in FIG. 12 as a single user. In various embodiments, first user 1211 can be two or more users (a tenant) of a first company or enterprise. Similarly, second user 1221 can be two or more users (a tenant) of a second company or enterprise.

Networked collector device 1230 monitors the network transactions of first networked device 1210 performed by first user 1211 and second networked device 1220 performed by second user 1221. Computer system 1240 receives from networked collector device 1230 for first user 1211 a first set 1213 of data specifying one or more network parameters per network address that communicates with first user 1211 of first networked device 1210. Computer system 1240 receives from networked collector device 1230 for second user 1221 a second set 1223 of data specifying one or more network parameters per network address that communicates with second user 1221 of second networked device 1220.

Computer system 1240 selects addresses from each of first set 1213 and second set 1223 where each of the one or more network parameters are above a first activity threshold level for that parameter. A first set of first level activity addresses 1214 and a second set of first level activity addresses 1224 are produced. Computer system 1240 generates a whitelist for first user 1211 from an intersection 1215 of first set 1214 of first level activity addresses and second set 1224 of first level activity addresses.

In various embodiments, the first activity threshold level separates "normal" network activity for a particular user from all other network activity for that user. There are many ways to calculate "normal" network activity. For example, it can be, but is not limited to, all activity above the statistical average.

As described above, a network whitelist of a user includes trusted or good network addresses. Typically, these trusted addresses are network addresses that communicated with the user and do not include the address or address of the networked device used by the user. In various embodiments, however, a network whitelist can also include trusted network addresses of devices used by the user. In this way, a breach of the user's account can be detected.

In various embodiments, second user 1221 is used to create the whitelist for first user 1211 because first user 1211 has a relationship with second user 1221. For example, computer system 1240 further selects second set 1224 of first level activity addresses for intersection with first set 1214 of first level activity addresses by receiving from first networked device 1210 a relationship parameter that indicates a relationship between first user 1211 and second user 1221.

In various embodiments, the one or more network parameters can include the number of sessions, the number of packets, and the number of bytes.

In various embodiments, first set 1213 and second set 1223 can be made up of data found from the intersection of data from two or more network parameters. For example, computer system 1240 further selects addresses from each of first set 1213 and second set 1223 by first sorting network addresses in first set 1213 and second set 1223 for each of the one or more network parameters by the activity level of each of the one or more network parameters. This sorting produces a sorted network address set for each of the one or more network parameters for each of the first set and the second set. Computer system 1240 then selects network addresses from each of the one or more sorted network address sets that are above a first activity threshold level for its network parameter. This selecting produces a first level activity address set for each of the one or more network parameters for each of the first set and the second set. Finally, computer system 1240 generates first set 1214 of first level activity addresses from the intersection of the one or more first level activity address sets of first set 1213 and second set 1224 of first level activity addresses from the intersection of the one or more first level activity address sets of second set 1223.

In various embodiments, each data set for the two or more network parameters can include multiple regions. For example, computer system 1240 further defines, for each of the one or more sorted network address sets for each of first set 1213 and second set 1213, a first region, a region of change in slope, and a second region. For example, in FIG. 9 Region 1 corresponds to the first region, Regions 2 and 3 correspond to the region of change in slope, and Region 4 corresponds to the second region.

Returning to FIG. 12, in various embodiments, computer system 1240 further selects an activity level within the region of change in slope of each of the one or more sorted network address sets for each of the first set and the second set as the first activity threshold level. The activity level defines the top 10% of the region of change in slope, for example.

In various embodiments, first set 1213 and second set 1223 can include multiple activity levels that allow segregation into second and third level activity sets in addition the first level activity set. For example, computer system 1240 further selects addresses from each of first set 1213 and second set 1223 where each of the one or more network parameters are between the first activity threshold level for that parameter and a second lower activity threshold level for that parameter. This selection produces a first set of second activity level addresses and a second set of second activity level addresses. Also, computer system 1240 further selects addresses from each of first set 1213 and second set 1223 where each of the one or more network parameters are below the second lower activity threshold level for that parameter. This selection produces a first set of third level activity addresses and a second set of third level activity addresses.

In various embodiments, through "class grouping," second and third level activity addresses in the same address class as an address already on the whitelist are added to the whitelist. For example, computer system 1240 further selects addresses from first set 1213 of second activity level addresses that have the same one or more network address classes as the intersection of first set 1214 of first level activity addresses and second set 1224 of first level activity addresses and adds the selected addresses to the whitelist. Similarly, computer system 1240 further selects addresses from the first set of third level activity addresses that have the same one or more network address classes as the intersection of first set 1214 of first level activity addresses and second set 1224 of first level activity addresses and adds the selected addresses to the whitelist.

In various embodiments, through "class grouping" first level activity addresses not found to intersect with other users are also added to the whitelist. For example, computer system 1240 further selects addresses from first set 1214 of first level activity addresses that do not intersect with second set 1224 of first level activity and have the same one or more network address classes as intersection 1215 of first set 1214 of first level activity addresses and second set 1224 of first level activity addresses and adds the selected addresses to the whitelist.

In various embodiments, a whitelist is generated from the intersection of first level activity addresses found for more than two users. For example, the system of FIG. 12 can further include a third networked device (not shown) in communication with network 1250. Computer system 1240 then further receives identifying information from the third networked device for a third user (not shown) and verifies and registers the third user as a user of the network service. Computer system 1240 receives from networked collector device 1230 for the third user a third set (not shown) of data specifying one or more network parameters per network address that communicates with the third user of the third networked device. Computer system 1240 selects addresses from each of first set 1213, second set 1223, and the third set where each of the one or more network parameters are above a first activity threshold level for that parameter. This produces first set 1214 of first level activity addresses, second set 1224 of first level activity addresses, a third set (not shown) of first level activity addresses. Computer system 1240 generates the whitelist for first user 1211 from an intersection (not shown) of first set 1214 of first level activity addresses, second set 1224 of first level activity addresses, and the third set of first level activity addresses.

In various embodiments, the whitelist is continually updated. For example, at each periodic time step over a period of time, computer system 1240 further receives from networked collector device 1230 for first user 1211 a first set of data specifying one or more network parameters per network address that communicates with the first user of the first networked device, receives from networked collector device 1230 for second user 1221 a second set of data specifying one or more network parameters per network address that communicates with the second user of the second networked device, and performs steps (e)-(f), producing an updated whitelist at each time step.

In various embodiments, a graylist is created from second activity level addresses. For example, computer system 1240 further generates a graylist for first user 1211 from an intersection of the first set of second activity level addresses and the second set of second activity level addresses.

In various embodiments, a blacklist is created from third level activity addresses. For example, computer system 1240 further generates a blacklist for first user 1211 that includes a union of the first set of third level activity addresses and the second set of third level activity addresses.

A network blacklist of a user includes network addresses that communicated with the user that are untrusted. A network graylist of a user includes network addresses that communicated with the user that are less trusted than addresses of the whitelist, but are not completely untrusted like the addresses of the blacklist.

Method for Whitelist Generation

Figure 13:
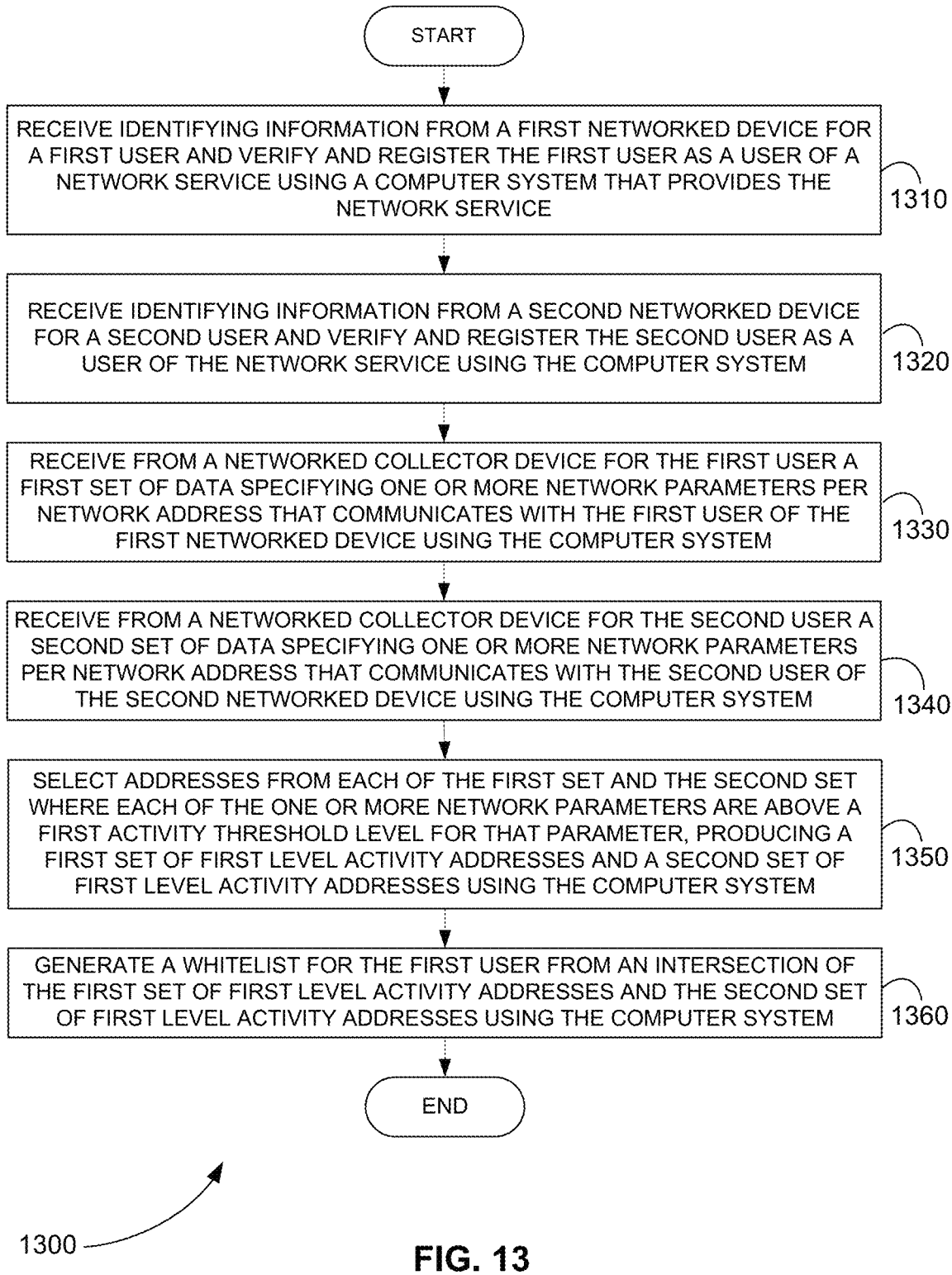
FIG. 13 is a flowchart showing a method for generating a network whitelist, in accordance with various embodiments.

FIG. 13 is a flowchart showing a method 1300 for generating a network whitelist, in accordance with various embodiments.

In step 1310 of method 1300, identifying information is received from a first networked device for a first user and the first user is verified and registered as a user of a network service using a computer system that provides the network service.

In step 1320, identifying information is received from a second networked device for a second user and the second user is verified and registered as a user of the network service using the computer system.

In step 1330, a first set of data specifying one or more network parameters per network address that communicates with the first user of the first networked device is received from a networked collector device for the first user using the computer system.

In step 1340, a second set of data specifying the one or more network parameters per network address that communicates with the second user of the second networked device is received from the networked collector device for the second user using the computer system.

In step 1350, addresses are selected from each of the first set and the second set where each of the one or more network parameters are above a first activity threshold level for that parameter. A first set of first level activity addresses and a second set of first level activity addresses are produced using the computer system.

In step 1360, a whitelist is generated for the first user from an intersection of the first set of first level activity addresses and the second set of first level activity addresses using the computer system.

Computer Program Product for Whitelist Generation

In various embodiments, computer program products include a tangible computer-readable storage medium whose contents include a program with instructions being executed on a processor so as to perform a method for generating a network whitelist. This method is performed by a system that includes one or more distinct software modules.

Figure 14:
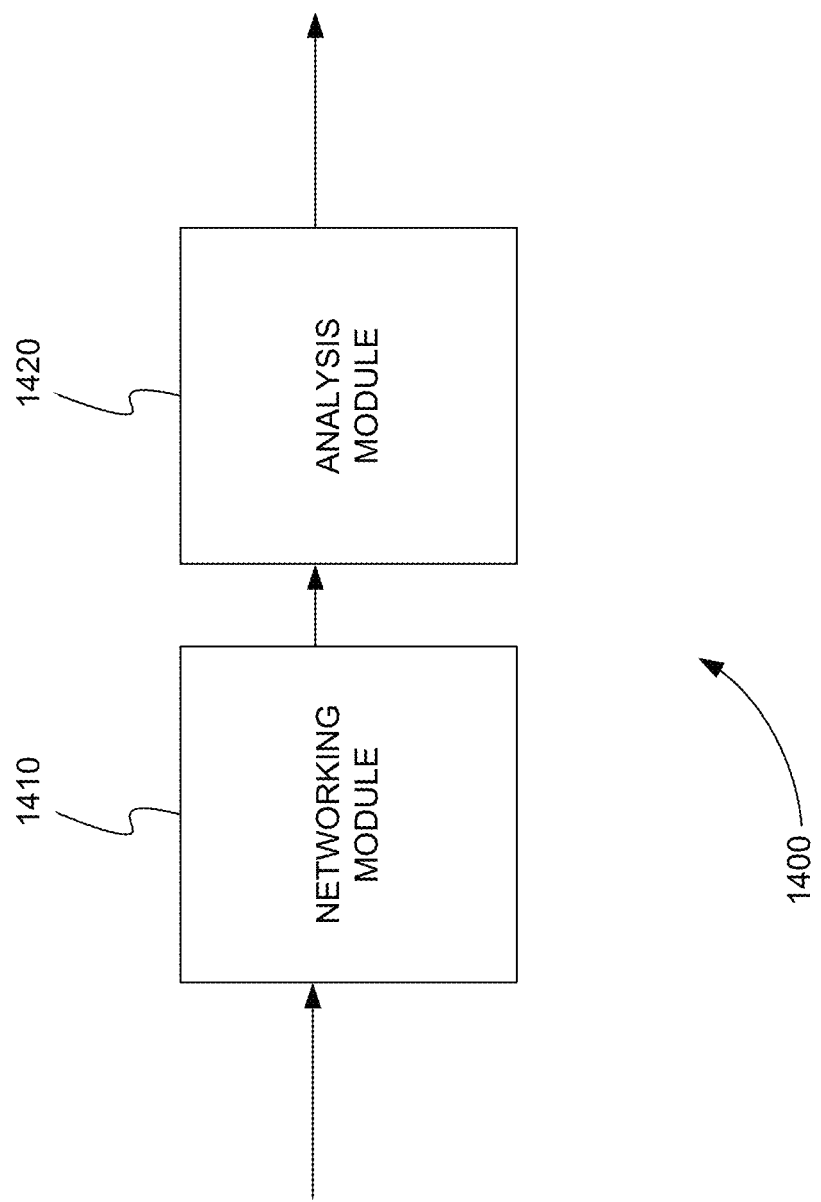
FIG. 14 is a schematic diagram of a system that includes one or more distinct software modules that performs a method for generating a network whitelist, in accordance with various embodiments.

FIG. 14 is a schematic diagram 1400 of a system that includes one or more distinct software modules that performs a method for generating a network whitelist, in accordance with various embodiments. The system of FIG. 14 includes networking module 1410 and analysis module 1420.

Networking module 1410 receives identifying information from a first networked device for a first user and verifies and registers the first user as a user of a network service provided by a computer system. Networking module 1410 receives identifying information from a second networked device for a second user and verifies and registers the second user as a user of the network service.

Networking module 1410 receives from a networked collector device for the first user a first set of data specifying one or more network parameters per network address that communicates with the first user of the first networked device. Networking module 1410 receives from the networked collector device for the second user a second set of data specifying the one or more network parameters per network address that communicates with the second user of the second networked device.

Analysis module 1420 selects addresses from each of the first set and the second set where each of the one or more network parameters are above a first activity threshold level for that parameter. A first set of first level activity addresses and a second set of first level activity addresses are produced. Analysis module 1420 generates a whitelist for the first user from an intersection of the first set of first level activity addresses and the second set of first level activity addresses.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for generating a network whitelist, comprising:
 a first networked device in communication with a network;
 a second networked device in communication with the network;
 a networked collector device in communication with the network; and a computer system in communication with the network that provides a network service for the network and that
- (a) receives identifying information from the first networked device for a first user and verifies and registers the first user as a user of the network service,
- (b) receives identifying information from the second networked device for a second user and verifies and registers the second user as a user of the network service,
- (c) establishes a relationship level of trust that is above a degree of trustworthiness level between the first user and the second user from the identifying information from the first networked device for the first user and identifying information from the second networked device for the second user;
- (d) receives from the networked collector device for the first user a first set of data specifying one or more network parameters per network address that communicates with the first user of the first networked device,
- (e) receives from the networked collector device for the second user a second set of data specifying one or more network parameters per network address that communicates with the second user of the second networked device,
- (f) selects addresses from each of the first set and the second set where each of the one or more network parameters are above a first activity threshold level for that parameter, producing a first set of first level activity addresses and a second set of first level activity addresses, and
- (g) generates a whitelist for the first user from an intersection of the first set of first level activity addresses and the second set of first level activity addresses.

2. The system of claim 1, wherein the computer system further selects the second set of first level activity addresses for intersection with the first set of first level activity addresses by receiving from the first networked device a relationship parameter that indicates a relationship between the first user and the second user.

3. The system of claim 1, wherein the one or more network parameters comprise a number of sessions.

4. The system of claim 1, wherein the one or more network parameters comprise a number of packets.

5. The system of claim 1, wherein the one or more network parameters comprise a number of bytes.

6. The system of claim 1, wherein the computer system further selects addresses from each of the first set and second set by
- sorting network addresses in the first set and the second set for each of the one or more network parameters by the activity level of each of the one or more network parameters, producing a sorted network address set for each of the one or more network parameters for each of the first set and the second set,
- selecting network addresses from each of the one or more sorted network address sets that are above a first activity threshold level for its network parameter, producing a first level activity address set for each of the one or more network parameters for each of the first set and the second set, and
- generating the first set of first level activity addresses from the intersection of the one or more first level activity address sets of the first set and the second set of first level activity addresses from the intersection of the one or more first level activity address sets of the second set.

7. The system of claim 6, wherein the computer system further for each of the one or more sorted network address sets for each of the first set and the second set defines a first region, a region of change in slope, and a second region.

8. The system of claim 7, wherein the computer system further selects an activity level within the region of change in slope of each of the one or more sorted network address sets for each of the first set and the second set as the first activity threshold level.

9. The system of claim 8, wherein the activity level defines the top 10% of the region of change in slope.

10. The system of claim 1, wherein the computer system further selects addresses from each of the first set and the second set where each of the one or more network parameters are between the first activity threshold level for that parameter and a second lower activity threshold level for that parameter, producing a first set of second activity level addresses and a second set of second activity level addresses.

11. The system of claim 10, wherein the computer system further selects addresses from each of the first set and the second set where each of the one or more network parameters are below the second lower activity threshold level for that parameter, producing a first set of third level activity addresses and a second set of third level activity addresses.

12. The system of claim 10, wherein the computer system further selects addresses from the first set of second activity level addresses that have the same one or more network address classes as the intersection of the first set of first level activity addresses and the second set of first level activity addresses and adds the selected addresses to the whitelist.

13. The system of claim 11, wherein the computer system further selects addresses from the first set of third level activity addresses that have the same one or more network address classes as the intersection of the first set of first level activity addresses and the second set of first level activity addresses and adds the selected addresses to the whitelist.

14. The system of claim 1, wherein the computer system further selects addresses from the first set of first level activity addresses that do not intersect with the second set of first level activity and have the same one or more network address classes as the intersection of the first set of first level activity addresses and the second set of first level activity addresses and adds the selected addresses to the whitelist.

15. The system of claim 1, further including a third networked device in communication with the network, wherein the computer system further
- receives identifying information from the third networked device for a third user and verifies and registers the third user as a user of the network service,
- establishes a relationship level of trust that is above a degree of trustworthiness level between the first user, the second user, and the third user from the identifying information from the first networked device for the first user, the identifying information from the second networked device for the second user, and the identifying information from the third networked device for the third user,
- receives from the networked collector device for the third user a third set of data specifying one or more network parameters per network address that communicates with the third user of the third networked device,
- selects addresses from each of the first set, the second set, and the third set where each of the one or more network parameters are above a first activity threshold level for that parameter, producing the first set of first level activity addresses, the second set of first level activity addresses, a third set of first level activity addresses, and generates the whitelist for the first user from an intersection of the first set of first level activity addresses, the second set of first level activity addresses, and the third set of first level activity addresses.

16. The system of claim 1, wherein at each periodic time step over a period of time the computer system further receives from the networked collector device for the first user a first set of data specifying one or more network parameters per network address that communicates with the first user of the first networked device, receives from the networked collector device for the second user a second set of data specifying one or more network parameters per network address that communicates with the second user of the second networked device, and performs steps (e)-(f), producing an updated whitelist at each time step.

17. The system of claim 10, wherein the computer system further generates a graylist for the first user from an intersection of the first set of second activity level addresses and the second set of second activity level addresses.

18. The system of claim 11, wherein the computer system further generates a blacklist for the first user that includes a union of the first set of third level activity addresses and the second set of third level activity addresses.

19. A method for generating a network whitelist, comprising:
receiving identifying information from a first networked device for a first user and verifying and registering the first user as a user of a network service using a computer system that provides the network service;
receiving identifying information from a second networked device for a second user and verifying and registering the second user as a user of the network service using the computer system;
receiving from a networked collector device for the first user a first set of data specifying one or more network parameters per network address that communicates with the first user of the first networked device using the computer system;
establishing a relationship level of trust that is above a degree of trustworthiness level between the first user and the second user from the identifying information from the first networked device for the first user and identifying information from the second networked device for the second user;
receiving from the networked collector device for the second user a second set of data specifying the one or more network parameters per network address that communicates with the second user of the second networked device using the computer system;
selecting addresses from each of the first set and the second set where each of the one or more network parameters are above a first activity threshold level for that parameter using the computer system, producing a first set of first level activity addresses and a second set of first level activity addresses; and
generating a whitelist for the first user from an intersection of the first set of first level activity addresses and the second set of first level activity addresses using the computer system.

20. A computer program product, comprising a non-transitory and tangible computer-readable storage medium whose contents include a program with instructions being executed on a processor so as to perform a method for generating a network whitelist, the method comprising:
providing a system, wherein the system comprises one or more distinct software modules, and wherein the distinct software modules comprise a networking module and an analysis module;
receiving identifying information from a first networked device for a first user and verifying and registering the first user as a user of a network service provided by a computer system using the networking module;
receiving identifying information from a second networked device for a second user and verifying and registering the second user as a user of the network service using the networking module;
receiving from a networked collector device for the first user a first set of data specifying one or more network parameters per network address that communicates with the first user of the first networked device using the networking module;
establishing a relationship level of trust that is above a degree of trustworthiness level between the first user and the second user from the identifying information from the first networked device for the first user and identifying information from the second networked device for the second user using the networking module;
receiving from the networked collector device for the second user a second set of data specifying the one or more network parameters per network address that communicates with the second user of the second networked device using the networking module;
selecting addresses from each of the first set and the second set where each of the one or more network parameters are above a first activity threshold level for that parameter using the analysis module, producing a first set of first level activity addresses and a second set of first level activity addresses; and
generating a whitelist for the first user from an intersection of the first set of first level activity addresses and the second set of first level activity addresses using the analysis module.

* * * * *